US011333253B2

(12) United States Patent
Pelletier

(10) Patent No.: US 11,333,253 B2
(45) Date of Patent: May 17, 2022

(54) MAGNETIC SEAL ASSEMBLY

(71) Applicant: PRATT & WHITNEY CANADA CORP., Longueuil (CA)

(72) Inventor: Marc-Andre Pelletier, St-Philippe (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 481 days.

(21) Appl. No.: 16/225,867

(22) Filed: Dec. 19, 2018

(65) Prior Publication Data
US 2020/0200277 A1 Jun. 25, 2020

(51) Int. Cl.
*F16J 15/34* (2006.01)
(52) U.S. Cl.
CPC ....... *F16J 15/3468* (2013.01); *F16J 15/3444* (2013.01); *F16J 15/3476* (2013.01); *F16J 15/3496* (2013.01)
(58) Field of Classification Search
CPC .. F16J 15/3468; F16J 15/3444; F16J 15/3476; F16J 15/3496
See application file for complete search history.

(56) References Cited

U.S. PATENT DOCUMENTS

| | | | | | |
|---|---|---|---|---|---|
| 3,578,345 | A | * | 5/1971 | Copes | F16J 15/3496 277/370 |
| 3,765,689 | A | * | 10/1973 | Adams | F16J 15/3468 277/359 |
| 3,819,191 | A | | 6/1974 | Voitik | |
| 4,261,581 | A | * | 4/1981 | Hershey | F16J 15/363 277/370 |
| 4,659,092 | A | * | 4/1987 | Wallace | F16J 15/3468 277/360 |
| 4,997,191 | A | * | 3/1991 | Warner | F16J 15/3464 277/377 |
| 5,192,085 | A | * | 3/1993 | McOnie | F16J 15/3476 277/370 |
| 6,761,359 | B2 | * | 7/2004 | Azibert | F16J 15/3404 277/370 |
| 2007/0210526 | A1 | * | 9/2007 | Basu | F16J 15/363 277/359 |
| 2007/0290450 | A1 | * | 12/2007 | Uhrner | F16J 15/3476 277/399 |
| 2008/0050261 | A1 | * | 2/2008 | Roddis | F16J 15/348 418/104 |
| 2014/0150453 | A1 | * | 6/2014 | Sekihara | F01D 9/023 60/796 |

(Continued)

FOREIGN PATENT DOCUMENTS

GB 2290587 A 1/1996

*Primary Examiner* — Vishal A Patel
(74) *Attorney, Agent, or Firm* — Norton Rose Fulbright Canada LLP

(57) ABSTRACT

A magnetic seal assembly comprises a metallic annular wear seal. A magnetic seal has a magnetic annular body adjacent to and attracting the wear seal into contact against a contact face thereof. A retainer ring is connected to a surface to the magnetic seal, the retainer ring having a coefficient of thermal expansion different than a coefficient of thermal expansion of the annular body, the coefficient of thermal expansion of the retainer ring selected to constrain a thermal expansion of the annular body. A method for controlling a thermal expansion of a magnetic seal assembly is also provided.

9 Claims, 3 Drawing Sheets

(56) References Cited

U.S. PATENT DOCUMENTS

| | | | |
|---|---|---|---|
| 2014/0154053 A1* | 6/2014 | Roberts | F02C 7/28 |
| | | | 415/121.3 |
| 2015/0226335 A1* | 8/2015 | Takahashi | F16J 15/348 |
| | | | 277/393 |
| 2018/0031130 A1* | 2/2018 | Berard | F16J 15/34 |
| 2018/0372160 A1* | 12/2018 | Mehmedovic | F16J 15/3464 |

* cited by examiner

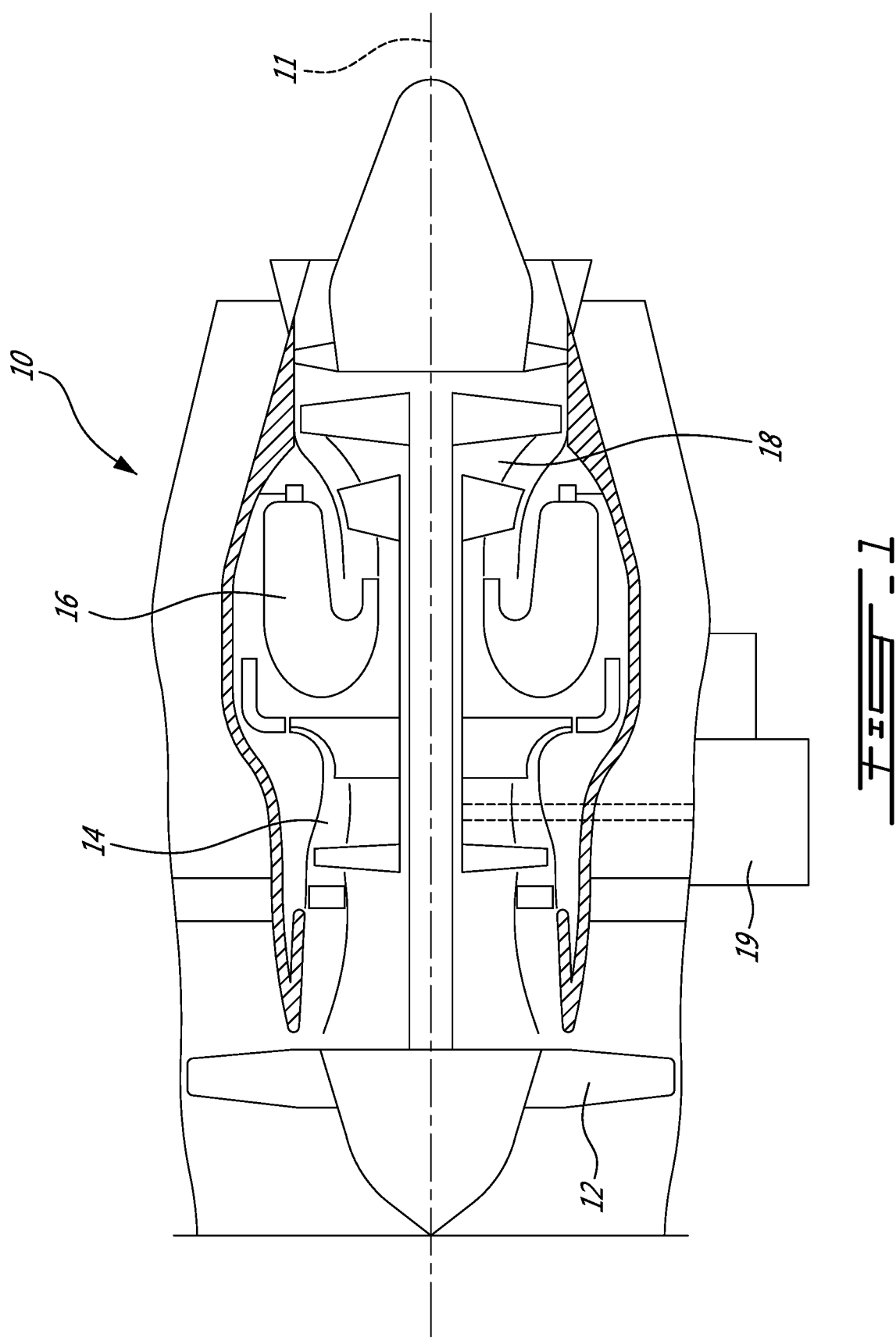

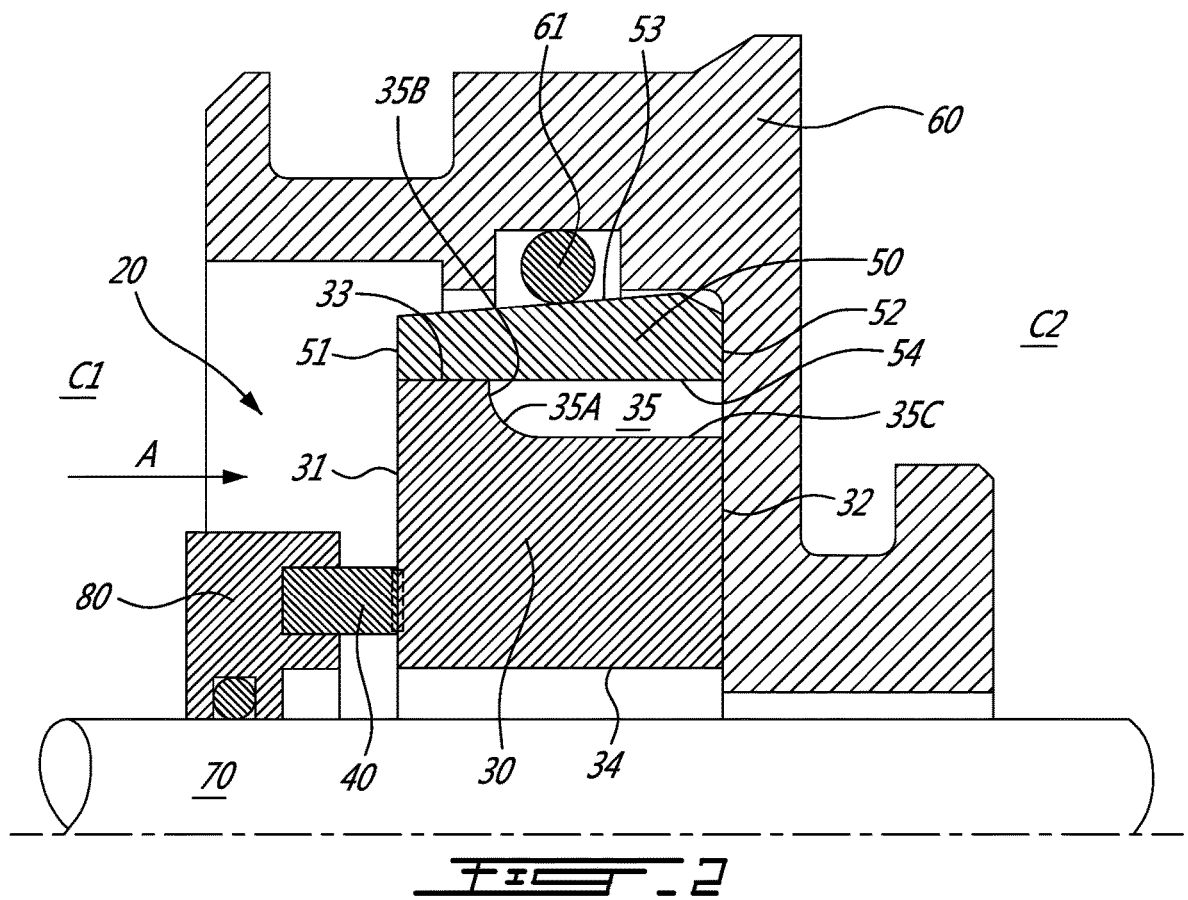
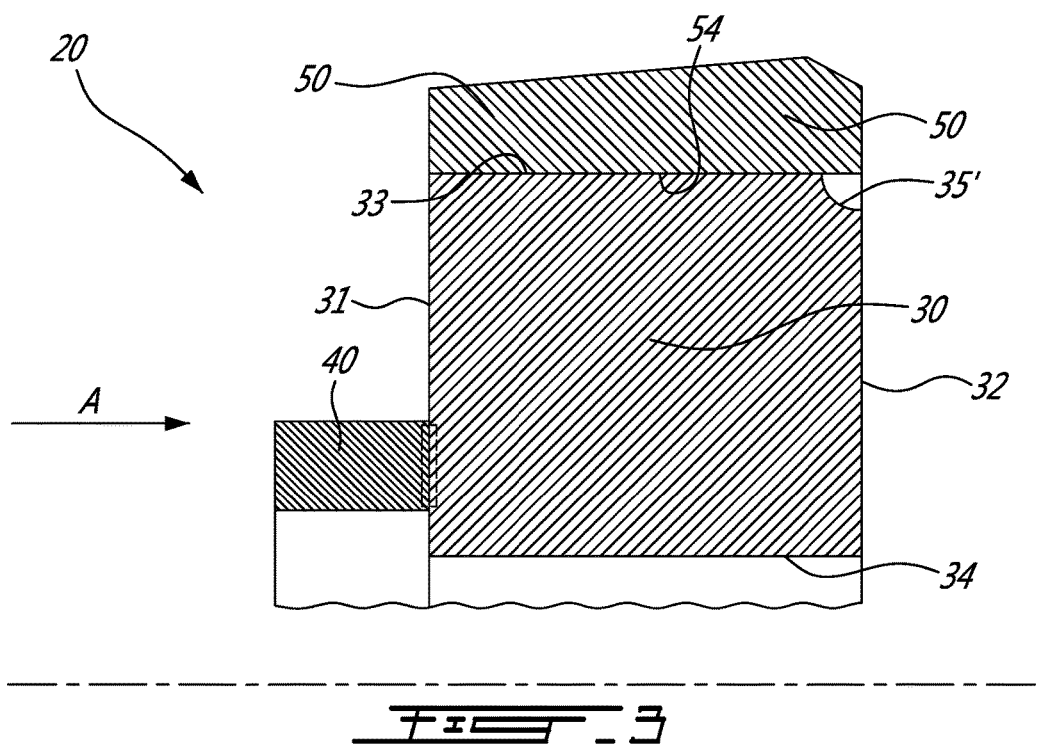

MAGNETIC SEAL ASSEMBLY

TECHNICAL FIELD

The application relates generally to magnetic seals of the type used to seal a rotating shaft.

BACKGROUND

Magnetic seal assemblies may be used for sealing compartments in rotating systems like gas turbine engines. These magnetic seal assemblies can include a magnet and a wear seal mounted on a shaft. A magnetic attraction between the magnet and the seal maintains the sealing integrity of the magnetic seal assembly.

At the interface between the magnet and the wear seal, heat is generated by friction which causes the contact side of the magnet/static runner to be significantly hotter than the other side. This difference in temperature produces an unequal radial thermal expansion and may therefore produce coning of the contact face of the magnet with the wear seal.

As the coning is prominent, the contact surface between wear seal and magnet is reduced and corner contact can occur. Localized corner contact can produce even higher heat generation and wear. There may also result oscillations through cycles of heating, deformation then cooling. This may contribute to accelerated wear of the magnetic seal.

SUMMARY

In one aspect, there is provided a magnetic seal assembly comprising a metallic annular wear seal, a magnetic seal having a magnetic annular body adjacent to and attracting the wear seal into contact against a contact face thereof, and a retainer ring connected to a surface to the magnetic seal, the retainer ring having a coefficient of thermal expansion different than a coefficient of thermal expansion of the annular body, the coefficient of thermal expansion of the retainer ring selected to constrain a thermal expansion of the annular body.

In another aspect, there is provided a method for controlling a thermal expansion of a magnetic seal assembly comprising biasing a metallic annular wear seal against a contact face of a magnetic seal, generating heat in the magnetic seal as a result of a relative rotation between the annular wear seal and the magnetic seal, whereby the magnetic seal generates thermal expansion forces, and applying radial forces to the magnetic seal by a thermal expansion of a retainer ring connected to a surface of the magnetic seal, the retainer ring thermally expanding at a coefficient of thermal expansion different than a coefficient of thermal expansion of the magnetic seal, whereby the thermal expansion forces and the radial forces cooperate to control a shape of the magnetic seal.

DESCRIPTION OF THE DRAWINGS

Reference is now made to the accompanying figures in which:

FIG. 1 is a schematic sectional view of a gas turbine engine featuring a magnetic seal assembly in accordance with the present disclosure;

FIG. 2 is a schematic sectional view of a magnetic seal assembly in accordance with a second embodiment of the present disclosure, with a retainer ring on an outer circumference of a magnetic seal and a clearance in the magnetic seal;

FIG. 3 is a schematic sectional view of a magnetic seal assembly in accordance with a first embodiment of the present disclosure, with a retainer ring on an outer circumference of a magnetic seal;

DETAILED DESCRIPTION

Figure 4:
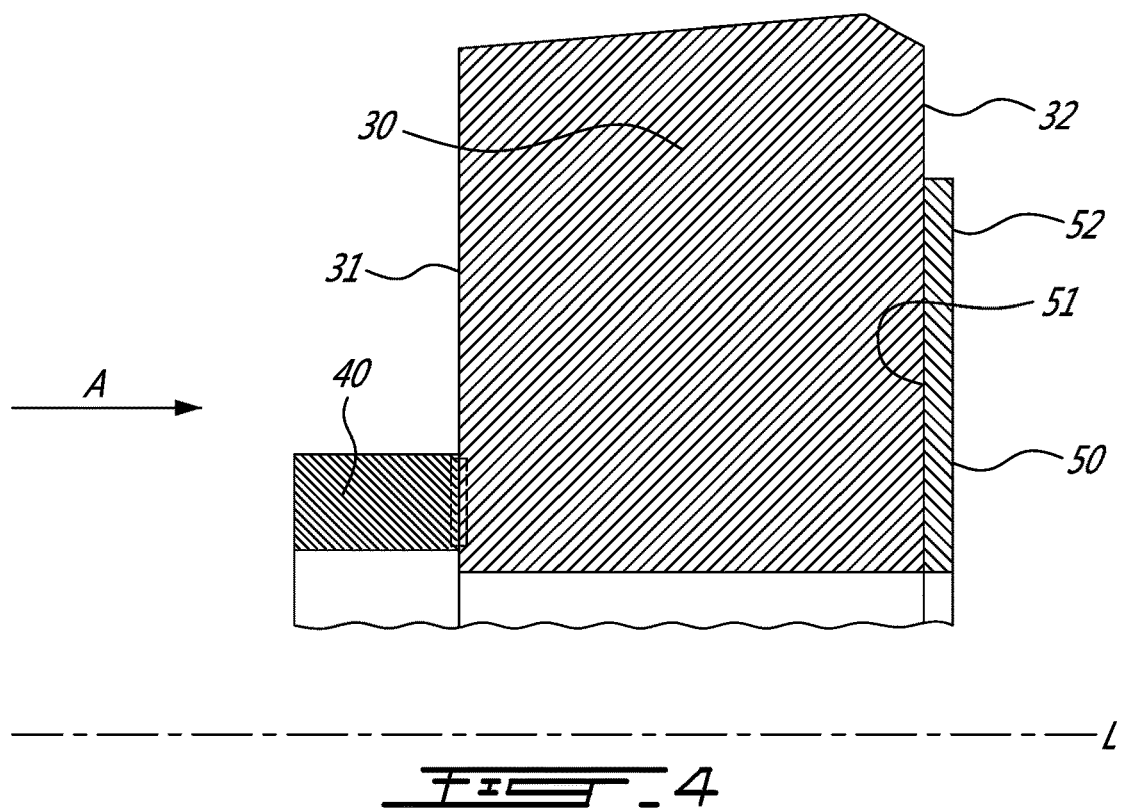
FIG. 4 is a schematic sectional view of a magnetic seal assembly in accordance with a third embodiment of the present disclosure with a retainer ring on an axial face of a magnetic seal.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. An accessory gearbox 19 may be driven by either one of the compressor 14 and the turbine section 18.

Referring to FIGS. 2-5, a magnetic seal assembly in accordance with various embodiments of the present disclosure is generally shown at 20. The magnetic seal assembly 20 may be of the type used in the accessory gearbox 19 (FIG. 1) of the gas turbine engine 10 (FIG. 1). It is also contemplated to use the magnetic seal assembly 20 in other parts of the gas turbine engine as well. For example, the magnetic seal assembly 20 can be used as an output shaft seal on a turboshaft and turboprop engines, as well as a bearing cavity seal on engine mainshafts.

Referring to FIG. 2, the magnetic seal assembly 20 may have a magnetic seal 30, a wear seal 40, and a retainer ring 50. The magnetic seal assembly 20 may be used to separate two cavities, such a cavity C1 and a cavity C2, on opposite sides of a seal housing 60. The seal housing 60 surrounds a shaft 70. The seal housing 60 may for example form or be connected to part of the structure of the gas turbine engine 10. The wear seal 40 may be mounted to the shaft 70, for instance by seal runner 80. The wear seal 40 may be a ring of carbon or like composites thereof. In the illustrated embodiments, the wear seal 40 and the seal runner 80 may be slidingly mounted to the shaft 70, so as to translate thereon in the axial direction A, while rotating about a longitudinal axis L of the shaft 70. The movement in the axial direction A may be caused by the magnetic attraction to or of the magnetic seal 30. Other biasing components may also be present, such as springs, bellows, etc, to bias the wear seal 40 against the magnetic seal 30, for sealing contact between the wear seal 40 and the magnetic seal 30. Although not shown, it may be only the wear seal 40 that moves in the axial direction A, while the seal runner 80 may remain stationary on the shaft 70, to rotate with the shaft 70. In FIGS. 2-5, the wear seal 40 may rotate with the shaft 70, while the magnetic seal 30 (in such an embodiment known as static runner) and retainer ring 50 are stationary and secured to the seal housing 60. The relative rotation between the wear seal 40 relative to the magnetic seal 30 and retainer ring 50 may be achieved in other ways, for example by having the magnetic seal 30 and the retainer ring 50 rotate with the shaft 70, while the wear seal 40 would be held stationary by the structure.

Numerous of the components described above, such as the magnetic seal 30, the wear seal 40, the retainer ring 50, the seal housing 60 and/or the seal runner 80, are annular, surrounding the longitudinal axis L of the shaft 70. The shaft 70 may also be annular, in the form of a tube. FIG. 2, for simplicity, show a first half of the annular components, above the longitudinal axis L. A mirror image of what is shown in FIG. 2 would or could be found on the opposite side of longitudinal axis L. Still for simplicity, numerous of the components found in FIG. 2 have been removed from FIGS. 3-5, such as the seal housing 60, the shaft 70, the seal runner 80. The magnetic seal assembly 20 in FIGS. 3-5 may be interfaced to these components in the manner described above. Moreover, the concept of mirror image as described for FIG. 2 applies to the magnetic seal assembly 20 of FIGS. 3-5.

Referring to FIG. 2, the magnetic seal 30 has an annular body. The annular body may for example be monolithic. The material of the annular body may be selected to produce, participate or react to a magnetic attraction force. In an embodiment, the magnetic seal 30 may be permanent magnet, for example. In another embodiment the magnetic seal 30 may be made of a ferro-magnetic material, with permanent magnets being in a support of the wear seal 40, again so as to have a drawing effect between the magnetic seal 30 and the wear seal 40. Hence, the expression "magnetic seal 30" does not necessary imply that the component 30 is a magnet. The expression "magnetic seal 30" may also indicate that the annular body 30 is attracted to a magnetic force.

The annular body may have a first face 31 or first side, against which the wear seal 40 is in contact. The first face 31 may be referred to as a contact face, wear seal interface, etc. The annular body may have a second face 32 or second side, away from wear seal 40. In FIG. 2, the first face 31 and the second face 32 lie in planes to which the longitudinal axis L is normal. However, other orientations for planes of the first face 31 and/or the second face 32 may vary. Over use, the first face 31 may become worn and lose some of its original geometry. Moreover, temperature variations may also impact the geometry of the first face 31 and/or the second face 32. The first face 31 and/or the second face 32 may be referred to as axial faces of the magnetic seal 30.

Still referring to FIG. 2, the annular magnetic body may have an outer circumferential surface 33 or outer side, and an inner circumferential surface 34 or inner side. The outer circumferential surface 33 may be radially outward of the inner circumferential surface 34, with the outer circumferential surface 33 and inner circumferential surface 34 being for example cylindrical in shape. In FIG. 2, the outer circumferential surface 33 and the inner circumferential surface 34 are generally concentric relative to the longitudinal axis L, though some offset may be present, such as during use, following perturbations, by design, etc. The outer circumferential surface 33 and/or the inner circumferential surface 34 may be referred to as peripheral faces and/or radial faces of the magnetic seal 30.

A clearance gap 35 may be defined in the annular body of the magnetic seal 30. The clearance gap 35 may have an annular geometry. In FIG. 2, the clearance gap 35 cuts into the second face 32 and into the outer circumferential surface 33, i.e., is in the form of material removal from the annular body 30 in such a way that an annular void of material is present (a.k.a., empty annular volume, annular clearance, etc). The clearance gap 35 may be bound by a fillet 35A at a junction between a radially extending face portion 35B and an axially extending face portion 35C. The fillet 35A may be optional. The clearance gap could also be defined in the retainer ring 50.

In FIG. 2, the retainer ring 50 has a generally annular body with a first face 51, a second face 52, an outer circumferential surface 53 and an inner circumferential surface 54. The retainer ring 50 may have a frusto-conical shape to its outer circumferential surface 53, but other shapes are contemplated as well including a cylindrical shape. Moreover, as observed from FIG. 2, a main surface is frusto-conical, but a second shorter section may also be frusto-conical as well, though optionally. The retainer ring 50 is mounted against the outer circumferential surface 33 of the magnetic seal 30, such that the inner circumferential surface 54 of the retainer ring 50 and the outer circumferential surface 33 of the magnetic seal 30 contact one another. In an embodiment, the retainer ring 50 is secured to the annular body of the magnetic seal 30 in such a way that they may not be separable from one another without some force. For example, the retainer ring 50 may be force fitted, interference fitted, adhered, mechanically retained, mechanically attached and/or fastened, to the outer circumferential surface 33. The retainer ring 50 may have the same axial length (i.e., in the axial direction A) as the magnetic seal 30, such that the retainer ring 50 overlaps and hovers over the clearance gap 35. The retainer ring 50 could also be shorter, such as to have the same axial length as the outer circumferential surface 33 of the magnetic seal 30, without a projection over the clearance gap 35.

The material of the retainer ring 50 is selected so as to have a coefficient of thermal expansion different than a coefficient of thermal expansion of the annular body of the magnetic seal 30. The coefficient of thermal expansion may also refer to the rate of thermal expansion, i.e., the tendency of the material to change or increase in dimensions as a result of exposure to an increase in temperature. According to an embodiment, the coefficient of thermal expansion is expressed in $\mu m \cdot m^{-1} \cdot K^{-1}$. In the arrangement of FIG. 2, with the retainer ring 50 being mounted radially outward of the magnetic seal 30, adjacent to the first face 31 against which the wear seal 40 contacts the magnetic seal 30, the retainer ring 50 has a material having a lesser coefficient of thermal expansion than that of the annular body of the magnetic seal 30. Stated differently, the material of the retainer ring 50 will expand less than the material of the magnetic seal 30, per a common distance unit. For example, the magnetic seal 30 may be made of AlNiCo, or like magnetic material, etc, while the retainer ring 50 may be made of an iron base alloy, titanium, etc.

Still referring to FIG. 2, the assembly of the magnetic seal 30 and retainer ring 50 is connected to the seal housing 60. The assembly is connected in any appropriate way to remain generally stationary relative to the seal housing 60, such as by force fitting, interference fitting, adhesion, mechanical retention, mechanical attachment and/or fasteners, and any combination thereof. Seals such as an elastomeric O-ring 61 may be at the interface, to block fluid leakage between the assembly of magnetic seal 30/retainer ring 50 and seal housing 60. In an embodiment, the O-ring 61 may assist in holding the assembly stationary relative to the seal housing 60.

During use, the contact and the relative rotation between the wear seal 40 and the first face 31 of the magnetic seal 30 causes generation of heat at the first face 31. Heat is generated by friction which causes the first face 31 of the magnetic seal 30 to be hotter than the second face 32. This difference in temperature may produce an unequal radial thermal expansion. The retainer ring 50 is positioned so as to constrain the magnetic seal 30 radially and thus to produce radial forces that oppose the thermal expansion at a first side portion including the first face 31. Stated differently, in operation, the retainer ring is a band of material that constrains the magnetic seal 30 to limit its radial displacement and may therefore result in limited coning of the first face 31.

The expansion gap 35 may contribute to the dynamics described above. In FIG. 2, the left side portion with the first face 31 is hotter and will have a bigger radial expansion than the right side portion including the second face 32, but each side will expand. The side portions may generally be defined as being two annular subportions of the annular body, and may be separate by an axial plane, i.e., a plane to which the longitudinal axis L is normal. The retainer ring 50 will only offset the displacement. With the presence of the expansion gap 35, the final coning may be minimized by letting the right side portion expand freely by adding the expansion gap 35, at which the magnetic seal 30 is not radially constrained by the retainer ring 50. The width and length of the retainer ring 50 and expansion gap 35 may be optimized based on the size of the magnetic seal assembly 30 and operational factors, such as temperatures. In an embodiment, the rate of radial displacement of the two side portions of the magnetic seal 30 are generally equal, namely the part of the magnetic seal 30 including the first face 31 and constrained by the ring 50, and the other side portion including the second face 32 and the clearance gap 35.

Still referring to FIG. 2, the variable thickness of the retainer ring 50 (i.e., in the radial direction), as a result of the frusto-conical shape, may also have an impact on the thermal expansion of the retainer ring 50. For example, the flaring may allow the retainer ring 50 to expand more locally than the narrower portion, and thus gradually impose less of a constraint. Hence, different geometries are contemplated. Because of the thermal gradient, the magnet may experience greater radial expansion at the side in contact with the carbon element than on the opposite side. The retainer ring 50 is only restricting the radial displacement, therefore the left-hand side in the figure is constrained, while the right-hand side expands, with the gap. The geometry of the retainer ring 50 may be optimized to obtain a magnet with limited, controlled or negligible coning. The outer diameter shape of the retainer ring 50 may be as illustrated to assemble it with a seal such as an O-ring and constrain its displacements.

Referring to FIG. 3, another embodiment of the magnetic seal assembly 20 is shown. The embodiment of FIG. 3 has numerous components in common with the embodiment of FIG. 2, whereby like reference numerals refer to like components. In FIG. 3, there is no clearance gap 35 in the magnetic seal 30. A smaller gap 35' may be present, to facilitate assembly or disassembly of the magnetic seal 30 and retainer ring 50.

Referring to FIG. 4, another embodiment of the magnetic seal assembly 20 is shown. The embodiment of FIG. 4 has numerous components in common with the embodiment of FIGS. 2 and 3, whereby like reference numerals refer to like components. In FIG. 4, the retainer ring 50 may be thin, and may thus be referred to as an annular disk. The retainer ring 50 is fixed to the second face 32 of the magnetic seal 30. The connection is rigid, and may be achieved in different ways, including mechanical bonding, welding, mechanical fasteners, etc. The second face 32 may even have a receptacle to receive the retainer ring 50. The material of the retainer ring 50 in FIG. 4 is selected so as to have a higher coefficient of thermal expansion than that of the magnetic seal 30. Therefore, a thermal expansion of the retainer ring 50 may cause a radial expansion of the part of the magnetic seal 30 including the second face 32, i.e., the part of the magnetic seal 30 away from the contact interface with the wear seal 40. This radial expansion from the second face 32 may be beyond the local thermal expansion, and can counter the thermal expansion at the first face 31, to reduce coning.

Figure 5:
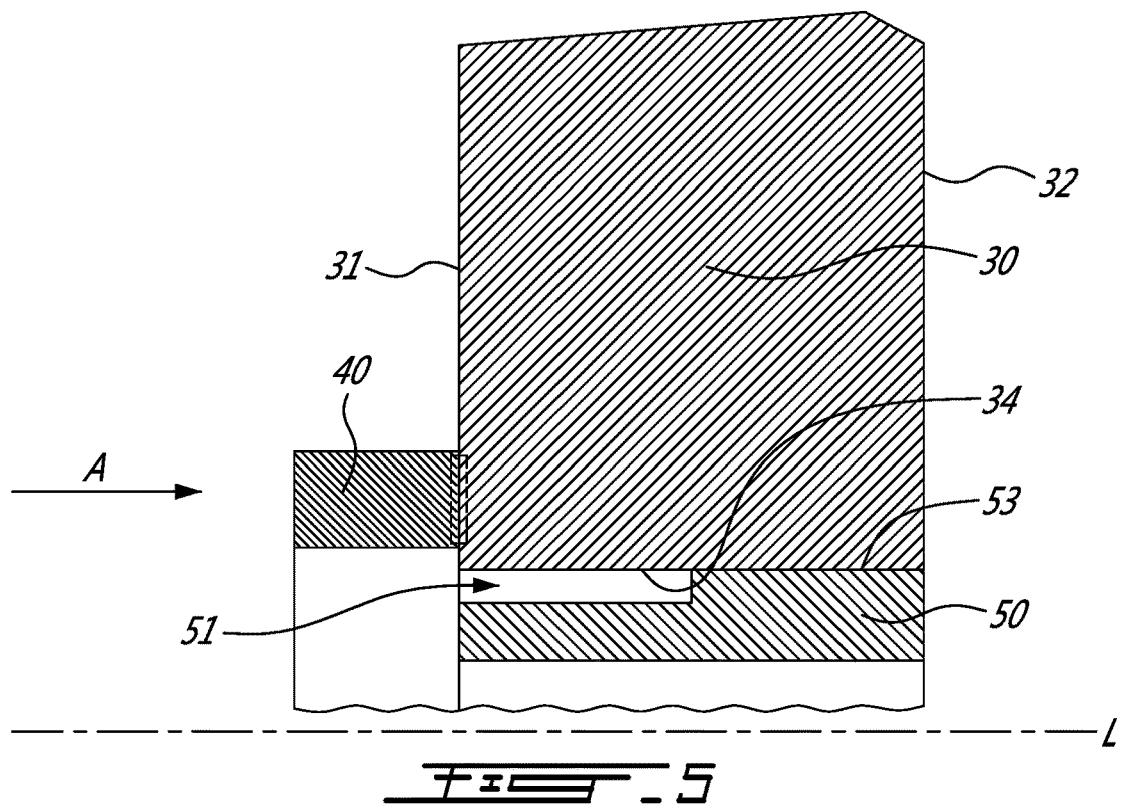
FIG. 5 is a schematic sectional view of a magnetic seal assembly in accordance with a fourth embodiment of the present disclosure with a retainer ring on an inner circumference of a magnetic seal.

Referring to FIG. 5, another embodiment of the magnetic seal assembly 20 is shown. The embodiment of FIG. 5 has numerous components in common with the embodiment of FIGS. 2, 3 and 4, whereby like reference numerals refer to like components. In FIG. 5, the retainer ring 50 is mounted against the inner circumferential surface 34 of the magnetic seal 30, such that the outer circumferential surface 53 of the retainer ring 50 and the inner circumferential surface 34 of the magnetic seal 30 contact one another. The retainer ring 50 may be secured to the annular body of the magnetic seal 30 in such a way that they may not be separable from one another without some force. As examples, the retainer ring 50 may be force fitted, interference fitted, adhered, mechanically retained, mechanically attached and/or fastened, to the inner circumferential surface 34.

In FIG. 5, the retainer ring 50 may have the same axial length (i.e., in the axial direction A) as the magnetic seal 30, but with a clearance gap 51 such that an annular void (a.k.a., expansion gap, annular clearance, empty space) is present in line with a part of the magnetic seal 50 including the first face 31, i.e., the part of the magnetic seal 30 in contact with the wear seal 40. The retainer ring 50 could also be shorter, such as to have a shorter axial length than the inner circumferential surface 34 of the magnetic seal 30, without a projection by way of a clearance gap.

The material of the retainer ring 50 in FIG. 5 is selected so as to have a higher coefficient of thermal expansion than that of the magnetic seal 30. As a result, a thermal expansion of the retainer ring 50 may cause a radial expansion of the part of the magnetic seal 30 including the second face 32, i.e., the part of the magnetic seal 30 away from the contact interface with the wear seal 40. This radial expansion from the second face 32 may be beyond the thermal expansion at the second face 32, and can counter the thermal expansion at the first face 31, to reduce coning.

The operation of the magnetic seal assembly 20 may be defined, in an embodiment, as a method for controlling a thermal expansion of a magnetic seal assembly. The method may include one or more of biasing an annular wear seal against a contact face of a magnetic seal; generating heat in the magnetic seal as a result of a relative rotation between the annular wear seal and the magnetic seal, whereby the magnetic seal generates thermal expansion forces; applying radial forces to the magnetic seal by a thermal expansion of a retainer ring connected to the magnetic seal, the retainer ring thermally expanding at a coefficient of thermal expansion different than a coefficient of thermal expansion of the magnetic seal. As a possible result, the thermal expansion forces and the radial forces cooperate to control a shape of the magnetic seal. The method may also include one or more of applying the radial forces to an outer circumferential surface of the magnetic seal; applying constraining radial forces to a first side portion of the magnetic seal including the contact face; applying the radial forces to an inner circumferential surface of the magnetic seal; applying expanding radial forces to a second side portion of the magnetic seal excluding the contact face; applying expanding radial forces to a second face of the magnetic seal away from the contact face.

The above description is meant to be exemplary only, and one skilled in the art will recognize that changes may be made to the embodiments described without departing from the scope of the invention disclosed. The magnetic seal assembly 20 may be more stable and reduce wear than magnetic seals without a retainer ring 50, which may lead to a greater seal life. The width and length of the retainer ring 50 and gaps 35, 51 may be adjusted for each embodiment described herein and specifically to the operational parameters of a gas turbine engine 10. Still other modifications which fall within the scope of the present invention will be apparent to those skilled in the art, in light of a review of this disclosure, and such modifications are intended to fall within the appended claims.

The invention claimed is:

1. A magnetic seal assembly comprising
a metallic annular wear seal,
a magnetic seal having a magnetic annular body extending between a contact face and a second face spaced apart across the magnetic annular body from the contact face, the magnetic annular body adjacent to and attracting the metallic annular wear seal into contact against the contact face, the metallic annular wear seal being rotatable relative to the contact face to generate heat at the contact face, the heat generated at the contact face creating a difference between a temperature of the magnetic annular body at the contact face and a temperature of the magnetic annular body at the second face;
a retainer ring having an annular inner surface contacting an annular surface of the magnetic seal, the retainer ring having an outer surface, the retainer ring having a coefficient of thermal expansion different than a coefficient of thermal expansion of the annular body, the coefficient of thermal expansion of the retainer ring selected to constrain a thermal expansion of the annular body; and
a seal housing having a seal between the seal housing and the outer surface of the retainer ring, the seal housing having a housing contact surface contacting the second face of the magnetic annular body.

2. The magnetic seal assembly according to claim 1, wherein the retainer ring is mounted to the annular surface of the magnetic seal.

3. The magnetic seal assembly according to claim 2, wherein the coefficient of thermal expansion of the retainer ring is less than the coefficient of thermal expansion of the annular body.

4. The magnetic seal assembly according to claim 1, wherein an axial length of the retainer ring, along an axis of rotation of the magnetic seal assembly, is at least as long as an axial length of the annular surface of the magnetic seal.

5. The magnetic seal assembly according to claim 1, wherein the outer surface of the retainer ring has a frusto-conical surface portion.

6. The magnetic seal assembly according to claim 1, wherein part of the annular inner surface of the retainer ring is mounted to part of the annular surface of the magnetic seal, a remainder of the annular inner surface of the retainer ring spaced radially from a remainder of the magnetic annular body to form an annular gap.

7. The magnetic seal assembly according to claim 6, wherein the annular gap extends axially from a first point spaced axially apart from the contact face to the second face.

8. A magnetic seal assembly comprising:
a metallic annular wear seal,
a magnetic seal having a magnetic annular body extending between a contact face and a second face spaced apart across the magnetic annular body from the contact face, the magnetic annular body adjacent to and attracting the metallic annular wear seal into contact against the contact face, the metallic annular wear seal being rotatable relative to the contact face to generate heat at the contact face, the heat generated at the contact face creating a difference between a temperature of the magnetic annular body at the contact face and a temperature of the magnetic annular body at the second face;
a retainer ring having an annular inner surface spaced apart from an outer surface, and a first retainer ring face spaced apart from a second retainer ring face, the retainer ring having a coefficient of thermal expansion different than a coefficient of thermal expansion of the magnetic annular body, the coefficient of thermal expansion of the retainer ring selected to constrain a thermal expansion of the magnetic annular body, part of the annular inner surface of the retainer ring contacting part of an annular outer surface of the magnetic annular body, a remainder of the annular inner surface of the retainer ring spaced from a remainder of the magnetic annular body to form an annular gap; and
a seal housing having a seal between the seal housing and the outer surface of the retainer ring, the seal housing having a contact surface contacting the second face of the magnetic annular body.

9. The magnetic seal assembly according to claim 8, wherein the annular gap extends axially from a first point spaced apart from the first retainer ring face to the second retainer ring face.

* * * * *